United States Patent
Olmstead et al.

(10) Patent No.: US 10,410,676 B2
(45) Date of Patent: Sep. 10, 2019

(54) PORTABLE TABLET COMPUTER BASED MULTIPLE SENSOR MOUNT HAVING SENSOR INPUT INTEGRATION WITH REAL TIME USER CONTROLLED COMMENTING AND FLAGGING AND METHOD OF USING SAME

(71) Applicant: Kb Port LLC, Allison Park, PA (US)

(72) Inventors: Clifford P Olmstead, Allison Park, PA (US); Charles G Miller, Allison Park, PA (US)

(73) Assignee: KbPort LLC, Pittsburgh, PA (US)

( * ) Notice: Subject to any disclaimer, the term of this patent is extended or adjusted under 35 U.S.C. 154(b) by 131 days.

(21) Appl. No.: 14/212,079

(22) Filed: Mar. 14, 2014

(65) Prior Publication Data

US 2014/0227671 A1    Aug. 14, 2014

Related U.S. Application Data

(63) Continuation-in-part of application No. 11/945,611, filed on Nov. 27, 2007, now Pat. No. 10,002,539, and
(Continued)

(51) Int. Cl.
*G09B 5/06* (2006.01)
*G11B 27/10* (2006.01)
*H04N 9/79* (2006.01)

(52) U.S. Cl.
CPC ............. *G11B 27/10* (2013.01); *G09B 5/06* (2013.01); *H04N 9/79* (2013.01)

(58) Field of Classification Search
CPC ............ G11B 27/10; G09B 5/06; H04N 9/79
(Continued)

(56) References Cited

U.S. PATENT DOCUMENTS 3,520,071 A    7/1970   Abrahamson et al.
5,403,192 A    4/1995   Kleinwaks et al.
(Continued)

OTHER PUBLICATIONS

RGB Spectrum, Press Release, http://www.rgb.com/en/News/PrintNews.asp?page=News%2FProductAnnouncements%2FDGx2, Mar. 19, 2003.
(Continued)

*Primary Examiner* — Robert P Bullington
(74) *Attorney, Agent, or Firm* — Buchanan Ingersoll & Rooney PC (57) ABSTRACT

An event recording system for multiple sensor integration with real time user controlled commenting and flagging includes a portable tablet computer including multiple source integrating recording software configured to i) capture at least one video image during at least part of the event, ii) capture at least one audio record of at least a portion of the event; iii) capture multiple data inputs from data sensors during at least part of the event; iv) contemporaneously flag the common log file by at least one user during the event; and v) Integrate each video image, each audio record, each data input and each flag into a common time sequenced log file; at least one video camera and microphone coupled to the portable tablet computer during at least part of the event configured to supply at least one video image and one audio input during at least part of the event; and at least two independent sensors coupled to the portable tablet computer during at least part of the event configured to supply at least two data inputs during at least part of the event.

23 Claims, 2 Drawing Sheets

Related U.S. Application Data a continuation-in-part of application No. 12/883,134, filed on Sep. 15, 2010, now Pat. No. 9,640,089.

(60) Provisional application No. 61/782,744, filed on Mar. 14, 2013, provisional application No. 60/867,199, filed on Nov. 27, 2006, provisional application No. 61/242,482, filed on Sep. 15, 2009.

(58) Field of Classification Search
USPC .......................................................... 434/262
See application file for complete search history.

(56) References Cited

U.S. PATENT DOCUMENTS

| | | |
|---|---|---|
| 5,701,153 A | 12/1997 | Reichek |
| 5,853,292 A | 12/1998 | Eggert et al. |
| 5,900,923 A | 5/1999 | Prendergast et al. |
| 5,941,710 A | 8/1999 | Lampotang et al. |
| 6,024,539 A | 2/2000 | Blomquist |
| 6,535,714 B2 | 3/2003 | Melker et al. |
| 6,938,029 B1 | 8/2005 | Tien |
| 7,113,201 B1 | 9/2006 | Taylor |
| 7,428,000 B2 | 9/2008 | Cutler |
| 7,648,365 B2 | 1/2010 | Olsen |
| 7,685,428 B2 * | 3/2010 | Piersol ................. G11B 27/105 386/287 |
| 8,113,844 B2 | 2/2012 | Huang |
| 2002/0045835 A1 | 4/2002 | Masakov et al. |
| 2004/0138864 A1 | 7/2004 | Kurzweil |
| 2004/0161731 A1 | 8/2004 | Arington |
| 2004/0204635 A1 | 10/2004 | Scharf |
| 2004/0263636 A1 | 12/2004 | Cutler |
| 2005/0057496 A1 | 3/2005 | Uchikbo |
| 2006/0085227 A1 | 4/2006 | Rosenfeld et al. |
| 2006/0179403 A1 | 8/2006 | Kirkpatrick |
| 2006/0212085 A1 | 9/2006 | Fischell |
| 2006/0264762 A1 | 11/2006 | Starr |
| 2006/0286524 A1 | 12/2006 | Boyers |
| 2006/0292536 A1 | 12/2006 | Hoster |
| 2008/0124694 A1 * | 5/2008 | Miller ..................... G09B 5/00 434/262 |
| 2008/0138780 A1 | 6/2008 | Eggert |
| 2008/0145830 A1 | 6/2008 | Huang et al. |
| 2008/0146277 A1 | 6/2008 | Anglin et al. |
| 2009/0275809 A1 | 11/2009 | Starr |
| 2010/0227303 A1 | 9/2010 | Deering |
| 2011/0223573 A1 | 9/2011 | Miller |

OTHER PUBLICATIONS

John W. Lutz, Thomas Dongilli, John J. Schaefer III, http://www.wiser.pitt.edu/sites/wiser/news/2004/03/media/IMMS_Lutz_poster.pdf , The Integration of Performance Logs with Digital Video for Review of Simulation Training Sessions, University of Pittsburgh Medical Center (UPMC), Peter M. Winter Institute for Simulation Education and Research (WISER).

AP Labs Inc., http://www.aplabs.com/digital_video.html, Digital Video Systems, APLabs.com 2007.

* cited by examiner

PORTABLE TABLET COMPUTER BASED MULTIPLE SENSOR MOUNT HAVING SENSOR INPUT INTEGRATION WITH REAL TIME USER CONTROLLED COMMENTING AND FLAGGING AND METHOD OF USING SAME

RELATED APPLICATIONS

The present application claims the benefit of provisional patent application Ser. No. 61/782,744 entitled "Portable Tablet Computer Based Multiple Sensor Mount having Sensor Input Integration with Real Time User Controlled Commenting and Flagging" filed Mar. 14, 2013.

The present application is a continuation in part of patent application Ser. No. 12/883,134 entitled "Method and Apparatus for Multiple Medical Simulator Integration" filed Sep. 15, 2010, and the '134 application claimed the benefit of U.S. Provisional Patent Application Ser. No. 61/242,482, entitled "Method and Apparatus for Multiple Medical Simulator Integration" filed Sep. 15, 2009.

The present application is a continuation in part of patent application Ser. No. 11/945,611 entitled "Method and Apparatus for Integrating Recording and Playback of Video Audio and Data Inputs" filed Nov. 27, 2007, and the '611 application claimed the benefit of U.S. Provisional Patent Application Ser. No. 60/867,199, entitled "Method and Apparatus for Integrating Recording and Playback of Video Audio and Data Inputs" filed Nov. 27, 2006.

FIELD OF THE INVENTION

The present invention relates to a method and modular apparatus for the integrated recording and playback of video, audio and multiple user selectable sensor inputs using portable tablet computer and implementing user controlled commenting and flagging.

BACKGROUND OF THE INVENTION

The following definitions will be helpful in explaining the known background elements that are helpful for understanding the present invention. The "personal computer" or simply "PC" is a term that is so often used it seems unlikely, at first, to require formal definition. However the precise scope of the term is sometimes vague. A PC is a computer whose size, and capabilities (and some have said price) make it useful for individuals, intended to be operated directly by an end user and capable of performing a variety of general purpose tasks, with no intervening computer operator. The PC may be a home computer, or may be found in an office, a medical facility or a research lab. The PC may often be connected to a local area network. The distinguishing characteristics of a PC are that the computer is primarily used, interactively, by one person at a time. This is opposite to the batch processing or time-sharing models which allowed large expensive systems to be used by many people, usually at the same time, or large data processing systems which required a full-time staff to operate. The PC can come in desktop models, notebook models, handheld models, and hybrids of these.

A "notebook computer", or simply "notebook" within this application, is an extremely lightweight PC. Notebook computers typically weigh less than 6 pounds and are small enough to fit easily in a briefcase. Aside from size and portability, the principal difference between a notebook computer and a non-notebook personal computer (e.g. a desktop computer) is the display screen. Notebook computers use a variety of techniques, known as flat-pane technologies, to produce a lightweight and non-bulky display screen. Laptop computers and tablet PCs are two types of notebook computers. Usually all of the interface hardware needed to operate the notebook computer, such as parallel and serial ports, graphics card, sound channel, etc., are built in to a single unit. Most notebook computers contain batteries to facilitate operation without a readily available electrical outlet.

A "laptop computer", or simply laptop, is, within this application, a subset of notebooks. A laptop will have a display and separate keyboard interface (e.g. "qwerty" keyboard), with the keyboard and the display typically hinged together. The term Laptop is sometimes used more broadly and equated with notebooks, but the term will have a narrower definition within this application.

A "Tablet PC" or is a notebook computer, also called a panel computer, and was first introduced by Pen Computing in the early 90s with their PenGo Tablet Computer and popularized by Microsoft. Its touch-screen or "graphics tablet/screen hybrid technology" technology allows the user to operate the computer with a stylus or digital pen, or a fingertip, instead of a keyboard or mouse. A tablet computer, or simply tablet, is a one-piece mobile computer. Tablets typically offer a touch screen, with finger (or stylus) gestures acting as the primary means of control, though often supplemented by the use of one or more physical context sensitive buttons or the input from one or more accelerometers; an on-screen, hideable virtual keyboard is generally offered as the principle means of data input. The term tablet as used herein will encompass personal computing devices also commonly called smart phones and the more antiquated personal digital assistants.

Though generally self contained a tablet computer may be connected to a physical keyboard (or other input device), and a number of hybrids that offer a detachable keyboard have been marketed since the mid 1990's, as have a number of convertible touch screen notebook computers that offer an integrated keyboard that can be hidden by a swivel joint or slide joint, exposing only the screen for touch operation. Tablets have also appeared in a foldable Booklet format that offer the user dual-touchscreens, and can be used as a notebook by displaying a virtual keyboard on one of display.

The input/output ports of a personal computer refer to the communications links through which the personal computers send and receive information, which generally include serial ports, parallel ports, wireless links or connectors (such as WI-FI and Bluetooth), and universal serial bus (USB) ports. In addition, some laptops have expansion slots for PCMCIA standard adaptor cards (Type I and Type II) that also form input/output ports.

A personal digital assistant (PDA), also known as a palmtop computer, or personal data assistant, is a defined herein as a type of tablet and is a mobile device that functions as a personal information manager. PDAs are generally considered obsolete with the widespread adoption of smart phones. Nearly all current PDAs have the ability to connect to the Internet. A PDA has an electronic visual display, enabling it to include a web browser, all current models also have audio capabilities enabling use as a portable media player, and also enabling most of them to be used as mobile phones. Most PDAs can access the Internet, intranets or extranets via Wi-Fi or Wireless Wide Area Networks. Most PDAs employ touch screen technology.

A smart phone is a mobile phone built on a mobile operating system, with more advanced computing capability connectivity than a feature phone, and thus is included herein under the broader definition of tablet computer. The first smart phones combined the functions of a personal digital assistant (PDA) with a mobile phone. More recent models added the functionality of portable media players, low-end compact digital cameras, pocket video cameras, and GPS navigation units to form one multi-use device. Many modern smart phones also include high-resolution touch screens and web browsers that display standard web pages as well as mobile-optimized sites. High-speed data access is provided by Wi-Fi and mobile broadband. In recent years, the rapid development of the mobile application, or mobile apps, market and of mobile commerce have been drivers of smart phone adoption.

The mobile operating systems (OS) used by modern smart phones include Google's Android, Apple's iOS, Nokia's Symbian, RIM's BlackBerry OS, Samsung's Bada, Microsoft's Windows Phone, Hewlett-Packard's webOS, and embedded Linux distributions such as Maemo and MeeGo. Such operating systems can be installed on many different phone models, and typically each device can receive multiple OS software updates over its lifetime. A few other representative operating systems are Mozilla's Firefox OS, Canonical Ltd.'s Ubuntu Phone, and Tizen.

As a representative example of an operating system Android is a Linux-based operating system designed primarily for touch screen mobile devices such as smart phones and tablet computers. Initially developed by Android, Inc., which Google backed financially and later purchased in 2005, Android was unveiled in 2007 along with the founding of the Open Handset Alliance: a consortium of hardware, software, and telecommunication companies devoted to advancing open standards for mobile devices. The first Android-powered phone was sold in October 2008.

Android is open source and Google releases the code under the Apache License. This open source code and permissive licensing allows the software to be freely modified and distributed by device manufacturers, wireless carriers and enthusiast developers. Additionally, Android has a large community of developers writing mobile applications that extend the functionality of devices, written primarily in a customized version of the Java programming language. For example, in October 2012, there were approximately 700,000 applications available for Android, and the estimated number of applications downloaded from Google Play, Android's primary app store, was 25 billion.

These factors have allowed Android to become the world's most widely used smartphone platform, overtaking Symbian in the fourth quarter of 2010, and the software of choice for technology companies who require a low-cost, customizable, lightweight operating system for high tech devices without developing one from scratch. Android's open nature has further encouraged a large community of developers and enthusiasts to use the open source code as a foundation for community-driven projects, which add new features for advanced users or bring Android to devices which were officially released running other operating systems. Android had a worldwide smart phone market share of 75% during the third quarter of 2012, with 500 million devices activated in total and 1.3 million activations per day.

The present invention relates to monitoring of physically sensed parameters of a given environment with one or more user selectable sensors in portable manner that allows the user to integrate real time contemporaneous comments in any recorded session.

Physical parameters are measured with any of an almost infinite number of available sensors. The list of physical sensors is extremely large and constantly growing. An illustrative non-exhaustive list of sensors known in the art include temperature sensors, humidity sensors, barometers, gyroscope, positional (e.g., GPS) sensors, pressure sensors, flow rate sensors (e.g. wind speed, water flow rates, etc), magnetism field or flux sensors, electrical field or flux sensors, gas sensors (e.g. carbon monoxide sensors, carbon dioxide sensors or radon gas detectors), particulate counters, air quality meters, discrete chemical sensors, motion sensors, strain gauges, radar sensors, sonar sensors, Lidar sensors, microwave sensors, volatile organic compound sensors, Nox sensors, CxO sensors, volt meters, thermal imaging sensors, accelerometers, video or spectral sensors, radiation sensors, acoustic sensors, seismic sensor, and thermal conductivity sensors.

The above incomplete listing is pulled mainly from sensors utilized in various inspection and portable surveillance fields in which the present mobile application has a large number of practical applications. Every field can yield its own unique set of available sensors, for example the medical field yields a number of physiologic sensors, which within the meaning of this specification is a sensor that measures a parameter related to a physical characteristic of a living subject, such as a human or animal. The types of physiologic sensors include, for example, blood pressure sensors, blood flow sensors, blood glucose sensors, blood cholesterol sensors, heart sound sensors, EMG sensors, EEG sensors, EKG sensors, EOG sensors, pulse sensors, oxygenation sensors, pulse-oximetry sensors, blood perfusion sensors, respiration sensors (both pressure, flow and rate), temperature sensors, additional blood gas sensors (such as nitrogen partial pressure, carbon dioxide partial pressure, carbon monoxide partial pressure, oxygen partial pressure, and pH level), motion sensors, strain gauges, body position sensors, limb motion sensors and the like. The medical field often does not need to utilize the portable aspects of the present invention, except for first responders, for whom integrating sensors with video and responder commenting could be useful for improving patient diagnosis and treatment following initial onsite emergency, transport and triage care. The medical field has been an early technology adopter or innovator accommodating and integrating multiple sensor inputs into a single device.

U.S. Patent Application Publication 2009-0275809 discloses a kiosk based portable modular kiosk based physiologic sensor system for clinical and research applications which is incorporated herein by reference and which teaches the modular implementation of multiple sensors on a tablet computer. A wide variety of medical sensors are disclosed, but the platform does not appear to be universally expandable, nor particularly portable and there is no ability for user controlled commenting and flagging that is necessary for many applications such as real time inspections and surveillance or real time contemporaneous notation.

U.S. Patent Application Publication 2002-0045835 discloses a notebook computer based on noninvasive physiologic sensor platform that is of general interest and is incorporated herein by reference. This reference discloses some aspects of sensor integration in a PC computer environment.

U.S. Published Patent Application 2006-0264762 discloses a personal computer (PC) based physiologic monitor system that includes a personal computer having a display and an input/output port for attachment to an external device. The PC based system also includes a physiologic sensor coupled to the personal computer through the input/output port so that a modified output of the physiologic sensor is graphically displayed on the display. A controller, a portion of which is disposed in the personal computer, modifies the output of the physiologic sensor and provides a feedback control signal for modifying the output of the physiologic sensor. This disclosure is incorporated herein by reference.

U.S. Patent Application Publication 2008-0146277, which is incorporated herein by reference, discloses a personal healthcare assistant that includes a variety of data devices which are connected to a telephonic connection to a healthcare provider via wireless connections to provide a variety of desired data to the healthcare provider and which can be partially controlled by the healthcare provider. Again a wide variety of medical sensors are disclosed, but the platform does not appear to be universally expandable, nor particularly portable and there is no ability for user controlled commenting and flagging that is necessary for many applications such as real time inspections and surveillance or real time contemporaneous notation.

Outside of the medical field, per se, is "Sensor Platforms' FreeMotion Library" which provides for the combination of process data from sensors, such as accelerometers, barometers, gyroscopes and magnetometers, on mobile devices to allow users to "interpret that data into contextual information meaningful to application developers." The FreeMotion Library works with Android and Windows 8 operating systems, and can also be embedded in microcontrollers and/or smart sensors. The FreeMotion Library utilizes an algorithmic technique of combining the outputs from two or more sensors recording a common event, providing a "fused result." The particular approach used here may be considered somewhat restrictive to allow for users to freely adopt any desired sensor output as the sensor outputs must fit the "algorithmic technique of combining the outputs", however this teaching illustrates that the general integration of sensor data is known in the art for use with mobile computing bases. A wide variety of sensors are disclosed, but the platform does not appear to be universally expandable to a variety of sensors, nor particularly portable and there is no ability for user controlled commenting and flagging that is necessary for many applications such as real time inspections and surveillance or real time contemporaneous notation.

U.S. Patent Application Publication 2008-0145830 discloses a method and associated system for computer readable recording medium for synchronous multimedia recording and playback with end user control of time, data and event visualization for playback control over a network. This disclosure, which is incorporated herein by reference, relates to integrating data from a training simulator with video of the training session. The system disclosed in U.S. Patent Application Publication 2008-0145830 is not well adapted for portable applications. See also U.S. Pat. No. 8,113,844 for similar teachings.

There remains a need for the integrated recording and playback of video, audio and multiple user selectable sensor inputs using portable tablet computer and implementing user controlled commenting and flagging.

SUMMARY OF THE INVENTION

In accordance with the present invention, an event recording system for multiple sensor integration with real time user controlled commenting and flagging includes a portable tablet computer including multiple source integrating recording software configured to i) capture at least one video image during at least part of the event, ii) capture at least one audio record of at least a portion of the event; iii) capture multiple data inputs from data sensors during at least part of the event; iv) contemporaneously flag the common log file by at least one user during the event; and v) Integrate each video image, each audio record, each data input and each flag into a common time sequenced log file; at least one video camera and microphone coupled to the portable tablet computer during at least part of the event configured to supply at least one video image and one audio input during at least part of the event; and at least two independent sensors coupled to the portable tablet computer during at least part of the event configured to supply at least two data inputs during at least part of the event.

The present invention is disclosed for portable applications, such as onsite inspections, onsite surveillance, first responder medical treatment, but is not limited thereto. The present invention has applications in all portable applications where integrated user selected sensor data and relevant video and audio recording would be helpful, and where real time user commenting and flagging is required.

Within the meaning of the present invention, time stamped contemporaneous (or real time) user commentary (or notes to the recorded integrated record) is also known as "flagging" within the meaning of this application. The flagging of the record can also be done subsequent to the session where the user, can expand upon contemporaneously added flags, add new flags, edit other flags, as desired.

The phrase data source inputs when associated with the portable event recording system of the present invention, reference data outputs of user selectable sensor throughout the duration of an event. The data source inputs will include an individual user display associated with each data source input and which image is user selectable and adjustable during event playback.

The term event is intended reference a given recorded session, which may be for representative example a building inspection, by a given user with a given set of data output sensors associated with the event. The term event can be used interchangeably herein with session. The user, could in certain circumstances, be a collection of individual users without changing the operation of the present invention.

The present invention allows reviewer commentary or flags to be added to the combined memory, or log file, in a time sequenced manner contemporaneously with the event and after the event has been recorded. The flags may be edited later and are not limited to text, the flags could be in audio segments or even audio video segments (e.g. a user inserts a time appropriate video commentary including a demonstration to better illustrate his comment). Consequently, the system of the present invention allows users to add or expand commentary or flags, generally via audio or text inputs, into the integrated log file to create appropriately located comments therein for a complete event record. These latter comments could be in audio or even video formats if desired for incorporation into subsequent playback of an event. Note that such latter added audio commentary for the flags video commentary added later may be noted by the system as non-contemporaneous to provide a clear review of the event. The flags, whether they include text, audio video or combinations thereof are considered data inputs within the meaning of this application.

The common log file creates an integrated log file of time stamped data from all of the video, audio and data inputs. From this integrated log file the users can simultaneously play back any, and all, of the inputs in a synchronized fashion. Each video and data input may be played back in its own, independently sizable and locatable window on a display, such as a smartphone display or separate laptop display. The data inputs will also have a conventional visual playback format designated by the controller for the specific sensor, and it is not uncommon for multiple data inputs from distinct sensor to be integrated via a common controller to be illustrated together. For example, in medical applications heart rate, blood pressure, breath rate, and blood oxygenation are typically shown numerically and graphically in one panel display. The audio inputs can be played back independently depending upon the set up of the playback display. Alternatively, all the selected audio inputs for an event may be appropriately mixed in the simultaneous feedback. The log file will also provide a display of the flags added to the file during playback.

The independent selection of the inputs for feedback allows the playback to remove extraneous inputs during playback of a certain portion of the event. The feedback controls will include standard digital playback options, such as play, stop, fast forward, time indexing, reverse and the like. This allows for sequential review of the same time period of an event with one set of inputs selected for play back and then a review of the same time period with an alternative set of inputs selected.

The integrated common log file provides for exporting a recorded session to any standard format, such as AVI or the like, for ease of transfer to other playback devices.

The present invention may be set up in a wireless network configuration in which stationary data sensors, and audio and video sources that come into range of the portable tablet computer are automatically integrated into the combined log file at that point.

These and other advantages will be clarified in the following description of the invention in association with the attached figures in which like reference numerals represent like elements throughout.

DETAILED DESCRIPTION OF THE INVENTION

Figure 1:
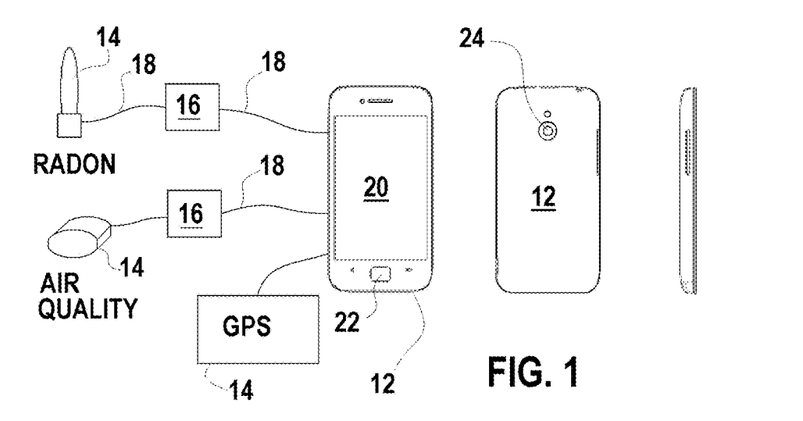
FIG. 1 is a schematic overview of a smartphone based multiple sensor mount, also called an event recording system, having sensor input integration with real time user controlled commenting and flagging in accordance with one aspect of the present invention useful for property and building inspection.

In accordance with the present invention, as shown in FIG. 1 FIG. 1 is a schematic overview of a smartphone 12 based multiple sensor mount, or event recording system, having sensor input integration with real time user controlled commenting and flagging in accordance with one aspect of the present invention useful for property and building inspection. The smartphone 12 based system of the present invention allows the system to follow the motto SEE IT, SENSE IT, FLAG IT™ for comprehensive inspection events or surveillance events.

The present invention incorporates and expands the applicant's ETC® brand system for integrating video, audio and data inputs for playback that was originally developed for the medical training field and disclosed in U.S. Patent Application Publication 2008-0124694 which is incorporated herein by reference. The ETC® system disclosed therein provides an apparatus for the integrated recording and playback of video, audio and data inputs using training simulators, such as patient simulators comprising the step of simultaneously receiving at least one data source input, at least one audio input and at least one video inputs into a common digital memory buffer in a time stamped manner for at least a given training event. At least one of the data source inputs is a data record throughout the event of at least one simulated parameter of the training simulator disclosed in U.S. Patent Application Publication 2008-0124694. Each audio input is an audio record of the training event and each video input is a video record of the training event. The common memory buffer allows independent, simultaneous, synchronized, user controlled playback of the individual inputs received within the memory buffer.

The ETC® brand system disclosed in U.S. Patent Application Publication 2008-0124694 was originally disclosed for patient simulators, but is not limited thereto and has applications in all training simulations where integrated simulation data and relevant recording would be helpful, such as flight simulators. However, the ETC® brand system disclosed in U.S. Patent Application Publication 2008-0124694 is particularly useful in "team training" simulators such as patient simulators where team interaction is critical.

One of the most significant features of the ETC® brand system disclosed in U.S. Patent Application Publication 2008-0124694 is the use for integrating digital video and audio recordings with data inputs in the form of time stamped moderator commentary or notes, and is particularly helpful in scenarios where contemporaneous moderator commentary can be added in a manner transparent to the subjects, whereby the subjects remain virtually unaffected by the moderator actions. The adding of time stamped moderator commentary or notes to the recorded integrated record is also known as "flagging" within the meaning of this application. The flagging of the record can also be done subsequent to the specific session where the moderator, or other reviewer or operator, can expand upon contemporaneously added flags, add new flags, edit other flags, as desired. The flags may be edited later and are not limited to text, the flags could be in audio segments or even audio video segments (e.g. a moderator inserts a time appropriate video commentary including a demonstration of a proper technique to better illustrate his comment). Consequently, the present invention allows subsequent moderators or reviewers or operators of any type (i.e. those NOT present at the training session or event) to add commentary or flags, generally via text or audio or video inputs, into the integrated log file to create appropriately located comments therein for review. Note that such latter added audio commentary for the flags is not an audio record of the original event as it is not contemporaneous therewith. The video commentary added later is similarly not a video record of the subject event.

The common log file creates an integrated log file of time stamped data from all of the video, audio and data inputs. From this integrated log file the users can simultaneously play back any, and all, of the inputs in a synchronized fashion. Each video input may be played back in its own, independently sizable and locatable window on a display, such as a laptop display. The data inputs from an associated simulator will also have a conventional visual playback format, and it is common for multiple data inputs to be illustrated together. For example, heart rate, blood pressure, breath rate, and blood oxygenation are typically shown numerically and graphically in one panel display. The audio inputs can be played back independently depending upon the set up of the playback display (e.g. left and right and or front and back side audio may be different). Alternatively, all the selected audio inputs may be appropriately mixed in the simultaneous feedback. The log file will also provide a display of the flags added to the file during playback.

The independent selection of the inputs for feedback allows the playback to remove extraneous inputs during playback of a certain portion of the session. For example, the audio inputs can be turned off and the playback only utilize an audio data file of an associated patient simulator with only a video centered on the patient simulator during a portion of the session where it was critical that the team participants recognize and change their actions based upon such simulator outputs.

The feedback controls will include standard digital playback options, such as play, stop, fast forward, time indexing, reverse and the like. Consequently in a detailed review and analysis of an event it is expected that moderators will play back a selected portion concentrating on one aspect, such as the patient simulator outputs, and then review the same portion of the session concentrating on the a separate aspect such as the participant actions. This sequential review of the same time period will entail a play back of the common log file with one set of inputs selected for play back and then a review of the same time period with an alternative set of inputs selected. Alternatively, for the video portions, the "concentration" on a particular section may be made by merely resizing of the desired windows to add emphasis as desired.

The integrated common log file provides for exporting a recorded session to any standard format, such as AVI or the like, for ease of transfer to other playback devices. The playback of an AVI or other "formatted" exported log file will no longer contain the ability to selectively elect the inputs for playback, as it will play back with the screen selections selected when transferred. However, this allows for easy transfer of a recorded, flagged training session to non-system computers.

A similer robust integration system for multiple medical simulators is taught in applicant's system disclosed in U.S. Patent Application Publication 2011-0223573, which is also incorporated herein by reference. U.S. Patent Application Publication 2011-0223573 discloses a system and associated method for multiple medical simulator integration comprising the steps of providing multiple medical simulators and simultaneously receiving at least one electronic data source input from each medical simulator into a common digital memory buffer in a time stamped manner for at least a given training event. Each electronic data source input is a data record throughout the event of a simulated parameter of the training simulator or a physical parameter of the training simulator. The common memory buffer allows independent, simultaneous, synchronized, user controlled playback of the individual inputs received within the memory buffer in any number of user defined configurations.

U.S. Patent Application Publication 2011-0223573 discloses a system and associated method addressing mobility of components in which the wireless network configuration is that it is designed to have video and audio feeds synch up automatically to the log file when they become in range of the associated controller during a session. It will be appreciated that the controller, manikins and/or the separate audio/video and data sources may be mobile. For example, the scenario may follow simulated patients from a remote scene on an ambulance into an emergency room then an operating room, with each stage of the process having its own set of feeds. With the wireless controller 14 formed as a laptop or other portable device it can easily move with the "patient" and pick up the various feeds as they come into range. Further, the cameras associated with the system and method of U.S. Patent Application Publication 2011-0223573 may be made mobile that can bring them into and out of range during a session. The auto-synch function of the system and method of U.S. Patent Application Publication 2011-0223573 allows for these variations to be accommodated without stopping the session and reconfiguring the system as each new source comes on line.

These prior applications of the applicant, together with the prior art systems discussed above, give some background for integrating sensor data and audio/video files for easy recording and meaningful playback. The applicant's prior patent applications establish the particulars of flagging utilized in the present invention.

The smartphone 12 based event recording system utilizes an on board digital recording system that will be described in detail below. The digital recording system may be effectively implemented as the ETC® digital recording system from the applicant and which is configured to run on an Android system which is a specific type of Linux-based operating system. The ETC® digital recording system is recording software which, as described below in greater detail is configured to i) capture at least one video image during at least part of the event, ii) capture at least one audio record of at least a portion of the event; iii) capture multiple data inputs from data sensors during at least part of the event; iv) contemporaneously flag the common log file by at least one user during the event; and Integrate each video image, each audio record, each data input and each flag into a common time sequenced log file.

A key aspect of the smartphone 12 based event recording system of the present invention is the use of user selectable data sensors 14 for any event. FIG. 1 is intended to illustrate a simplified example of the present invention useful for building or property inspections focusing on air quality and radon concentrations. The data sensors 14 utilized in this illustration include a radon detector, and an air quality detector (e.g. a particulate counter) each of which have their own controller 16, and possibly their own power source (not shown). The respective controller 16 will format the output of each sensor 14 for recording and display in its own designated fashion, and as discussed below this output display will effectively or conceptually be treated as a separate video input by the digital recording system that will be described in detail below. The output of each controller 16 is coupled to the smartphone 16 via a conventional coupling 18 which may be a wired connection or maybe a Bluetooth or other wireless connection.

The smartphone 12 based event recording system of the first embodiment as shown in FIG. 1 includes a GPS data sensor 14, which may be, as shown, an integral part or function of the smartphone 12 (and thus this on board sensor will have no separate controller 16). The output of the on board GPS sensor 14 can be considered analogous to the other sensors 14 in that this output display will effectively or conceptually be treated as a separate video input by the digital recording system.

The smartphone 12 based event recording system of the first embodiment as shown in FIG. 1 includes a microphone 22 that is an integral part of the smartphone 12 and a video camera 24 that is also typically an integral part of the smart phone 12.

The smartphone 12 additionally includes a control screen 20 to start and stop the recording of an event and for the user to add a contemporaneous flag via text or audio or both.

Figure 2:
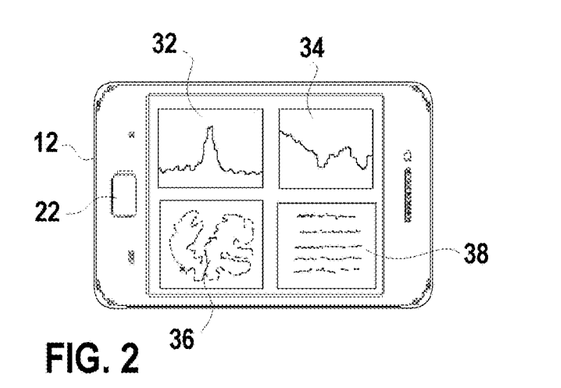
FIG. 2 is a schematic screenshot illustrating one set of video and data displays for the smartphone based event recording system according to FIG. 1.

FIG. 2 is a schematic screenshot illustrating one set of video and data displays for the smartphone 12 based event recording system according to FIG. 1. Here the user has selected, in the manner described below, to illustrate the data output 32 of the radon detection over an event, the data output 34 of the air quality sensor detection over an event, the data output 36 of the GPS positioning over an event, and a listing 38 of the user incorporated flags for the event. The radon outputs 32 and the air quality outputs 34 are shown as graphs of results over the time of the event and on playback will be shown in time sequence and selecting any point on these graphs will show a corresponding point in time on the other graph as well as the GPS map display 36. The GPS display is an overlay of the user's position on a two dimensional map over the time of the session and picking a point on the display will highlight the corresponding point on other time sequence displays. Element 38 is a listing of the user flags that were incorporated in and these may be texts or audio, or even video, or combination thereof that are placed in the log file by the user during the event. These are time sequenced such that selecting a given flag will highlight the other data displays at that given point. Not shown is that the video from camera 24 recorded during the event could also be selectively displayed in a given window. As discussed below the system allows the playback to selectively hide and size each widow as desired. Further playback controls can be shown or hidden on playback. FIG. 2 shows the playback on the smartphone 12, but the system can transfer the playback to another display, such as a laptop that may be easier for review.

With this brief explanation it should be clear that the smartphone 12 based system of the present invention allows the user of the system to follow the motto SEE IT, SENSE IT, FLAG IT™ for comprehensive inspection events or surveillance events. The user can start recording a session that will integrate the audio, video and data files in one integrated session and the user can carry the smartphone 12 and sensors 14 (which may have their own carrier) around a property or building and add contemporaneous flagged comments during the review. For example the user may wish to comment on areas of high radon, or high particulate readings by noting relevant factors or issues either via text or simply noting a flag and starting and stopping an audio input flag via controls on the controller 20. The system seamlessly integrates these inputs for later review in any desired fashion.

Figure 3:
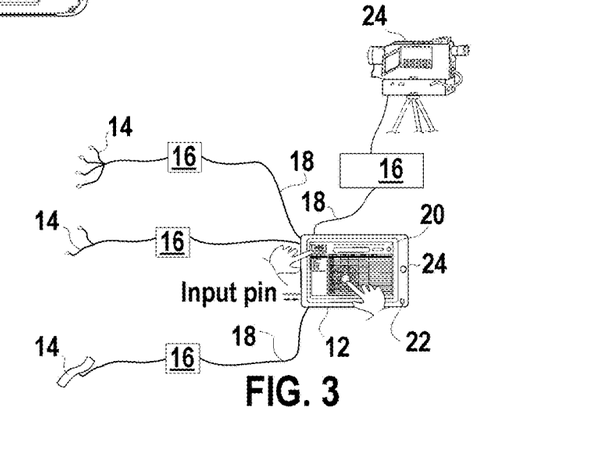
FIG. 3 is a schematic overview of a tablet computer based multiple sensor mount, or event recording system, having sensor input integration with real time user controlled commenting and flagging in accordance with one aspect of the present invention useful for medical first responders.

FIG. 3 is a schematic view of a portable tablet 12 based event recording system is a physiologic sensor system configured for medical first responders as an illustrative example. The system also is configured to simultaneously utilize multiple sensors 14.

The tablet 12 based event recording system utilizes an on board digital recording system noted above and which will be described in detail below. The digital recording system is recording software which, as described below in greater detail is configured to i) capture at least one video image during at least part of the event, ii) capture at least one audio record of at least a portion of the event; iii) capture multiple data inputs from data sensors during at least part of the event; iv) contemporaneously flag the common log file by at least one user during the event; and Integrate each video image, each audio record, each data input and each flag into a common time sequenced log file.

The data sensors 14 utilized in this illustration of FIG. 3 include a series of physiologic sensors for a patient. The respective controller 16 will format the output of each sensor 14 for recording and display in its own designated fashion, and as discussed below this output display will effectively or conceptually be treated as a separate video input by the digital recording system that will be described in detail below. The output of each controller 16 is coupled to the smartphone 16 via a conventional coupling 18 which may be a wired connection or maybe a Bluetooth or other wireless connection. A series of sensors 14 may be coupled to a single controller 16 that outputs a common display.

The multiple sensors 14 can be attached to tablet 12 via the controller 16 through conventional PC input ports or wirelessly via coupling 18. The input/output ports of a personal computer 12 refer to the communications links through which the personal computer 12 send and receive information, which generally include serial ports, parallel ports, wireless links or connectors (such as WI-FI and Bluetooth), and universal serial bus (USB) ports. Where a physical connection is used (i.e. non-wireless), the USB port will be the preferred connection for the present invention as several such input ports are commonly provided on commercially available PC tablet computers 12.

The Tablet PC 12, also called a panel computer, that incorporates a touch-screen or "graphics tablet/screen hybrid technology" technology that allows the user to operate the computer with a stylus or digital pen, or a fingertip, instead of a keyboard or mouse. A joystick may be incorporated into the tablet 12 as a separate user input device.

The event recorder system present invention is coupled to a series of physiologic sensors 12 that are configured to be coupled to an input port of the PC 12 such as through a USB port or through a wireless connection. Each sensor is configured to measure a parameter related to a physical characteristic of a patient, generally human but possibly animal.

The types of physiologic sensors 14 include, for example, blood pressure sensors, blood flow sensors, blood glucose sensors, blood cholesterol sensors, heart sound sensors, EMG sensors, EEG sensors, EKG sensors, EOG sensors, pulse sensors, oxygenation sensors, pulse-oximetry sensors, blood perfusion sensors, respiration sensors (both pressure, flow and rate), temperature sensors, additional blood gas sensors (such as nitrogen partial pressure, carbon dioxide partial pressure, carbon monoxide partial pressure, oxygen partial pressure, and pH level), motion sensors, strain gauges, body position sensors, limb motion sensors and the like.

The sensors 14 will typically include controller 16 (including, for example an analog to digital converter) between the sensor elements 14 that are coupled to the subject and the PC coupling. Additionally the sensors 14 will occasionally need power. The sensors 14 may be plugged into a power supply through a separate power cord. However, in one preferred aspect of the present invention separate power supply is incorporated into each sensor 14 to allow for elimination of the external power coupling and the need for a close proximity source of power. A separate method of eliminating the external power supply in the sensors is to design the sensors to draw power from the PC 12 through the coupling to the PC. The elimination of the external power supply on the sensors 14 will assist in the portability of the system.

The modular aspect of the system in accordance with the present invention is that a plurality of user selectable sensors 14 is provided for use in the system. It is anticipated that the user will utilize a plurality of sensors 14 at the same time for any given subject as shown in FIG. 3. It is expected that these sensors 14 can be easily plugged into and removed from the PC.

The system includes at least one camera 24 which here are shown as several separate "stationary" cameras representing distinct points along the emergency medical treatment path. One camera may be integral with the tablet 12, another may be mounted in the conveyance (e.g. the ambulance), another in the triage room(s), with the system picking up the feeds from respective cameras as the tablet 12 comes in range. The system allows the patient to be fitted with sensors 14 in the field (as soon as practical) and the system will record the particulars of the event. The users can flag critical commentary via text or audio or both, for example the patient may be, as part of one flag, asked critical questions at the time the first responders are present that the patient may not be able to supply later and the system integrate these responses.

The data inputs are indicative of each physiologic parameter measured by the associated sensor 12 (e.g. heat rate, breath rate, blood pressure, blood oxygenation, body temperature, pupil dilation, extremity changes, etc).

The system of the present invention will allow the recorded event to be played back on a standard separate computer with associated display, and will allow the event to be played back on other devices, such as other networked computers, coupled to the tablet 12. As discussed above, flags may be edited later via the tablet to add to the record. Consequently, the present invention allows subsequent reviewers to add commentary or flags, via computer 12, into the integrated log file to create appropriately located comments therein for review. These latter comments could be in audio or even video formats if desired for incorporation into subsequent playback of a moderated or graded session and preferably have a notation to indicate they are not contemporaneous.

A plurality of video cameras 24 will provide video feeds of the event from different view points, such as from the tablet, from the ambulance and from the triage ward. The cameras 24 may be fixed in position or may be controlled to allow users to adjust the view as desired. Each camera 24 may further carry a microphone for recording of a separate audio signal. Preferably the tablet 12 also includes an integral microphone. The video feeds from the cameras 24 may be through a frame grabber card or through a digital web cam device.

The operation of the digital recorder is generally known as detailed in the above citations, but can be summarized as follows: the recorder simultaneously receives a plurality of data source inputs, at least one audio input and at least one video inputs into a shared memory ring buffer. Any number of video and audio inputs may be used in the present invention, and recorder utilized in the present invention has found excellent operation with eight or more separate video and audio channels or data inputs. Eight audio and video channels have been found to be well more than enough to cover all the different viewpoints and data inputs that have been typically desired in various portable applications. Greater numbers are possible but hard for the user to consider in an integrated fashion and very difficult to simultaneously display and simultaneously consider by the user. The ring buffer provides a buffer against disk reading slow downs due to movement of the disk drive.

The ring buffer sends the received data and will send the data in time order, i.e. time stamped, to a ring type back buffer. The ring back buffer will maintain a set time of integrated log file of all of the inputs. This back buffer will send the integrated log file of the data sources to a hard drive if instructed to "record". With this configuration, the system is always "recording" due to the ring back buffer, but permanent records are maintained only in when the system receives instructions to record. The record command can therefore be "back dated" the length of the ring back buffer (typically around 5 minutes). In other words, if something happens in location that the user would wish to capture in a new recorded session there will be a short buffer time to allow the session to begin and hitting "record" will capture the last 5 minutes (or the length of the ring buffer). This aspect is helpful in surveillance applications where the system supplement other monitoring and such monitors (e.g. motion sensors) can be used to trigger an event recording.

With a recorded session, e.g. the time stamped integrated log file of all data source inputs) sent to the hard drive, the hard drive allows independent, simultaneous, synchronized, user controlled playback of the individual inputs received within the memory buffer on computer 12.

The users can simultaneously play back any, and all, of the inputs in a synchronized fashion. Each video or data input may be played back in its own, independently sizable and locatable window on a display, such as the display on computer 12. It is common for multiple data inputs to be illustrated together. For example, as shown heart rate, blood pressure, breath rate, and blood oxygenation are typically shown numerically and graphically in one panel display.

The audio inputs can be played back independently depending upon the set up of the playback display (e.g. left and right and or front and back side audio may be different). Alternatively, all the selected audio inputs may be appropriately mixed in the simultaneous feedback.

As discussed above, the independent selection of the inputs for feedback allows the playback to remove extraneous inputs during playback of a certain portion of the session. The feedback controls will include standard digital playback options, such as play, stop, fast forward, time indexing, reverse and the like.

The present invention allows the user or subsequent reviewers to add commentary flags, generally via text inputs and/or audio inputs, into the integrated log file stored on the hard drive to create appropriately located comments therein for review. These latter comments could be in audio or even video formats if desired for incorporation into subsequent playback of a session.

The integrated common log file provides for exporting a recorded session to any standard format, such as AVI or the like, for ease of transfer to other playback devices. The playback of an AVI or other "formatted" exported log file will no longer contain the ability to selectively elect the inputs for playback, as it will play back with the screen selections selected when transferred.

Another feature of the system is that it is designed to have video and audio and sensor feeds synch up automatically to the log file when they become in range of the tablet 12 during a session. For example, as discussed above the scenario may follow a patient from a remote scene then onto an ambulance into a triage ward or an emergency room then an operating room, with each stage of the process having its own set of feeds. The tablet 12 can easily move with the "patient" and pick up the various feeds as they come into range. Further, the cameras may be made mobile that can bring them into and out of range during a session. The auto-synch function allows for these variations to be accommodated without stopping the session and reconfiguring the system as each new source comes on line.

A review of the display 60 associated with the system 10 may be helpful for demonstrating the aspects of the present invention. The displays can be modified greatly depending upon the particular application of the system 10 and the needs of the users.

Figure 4:
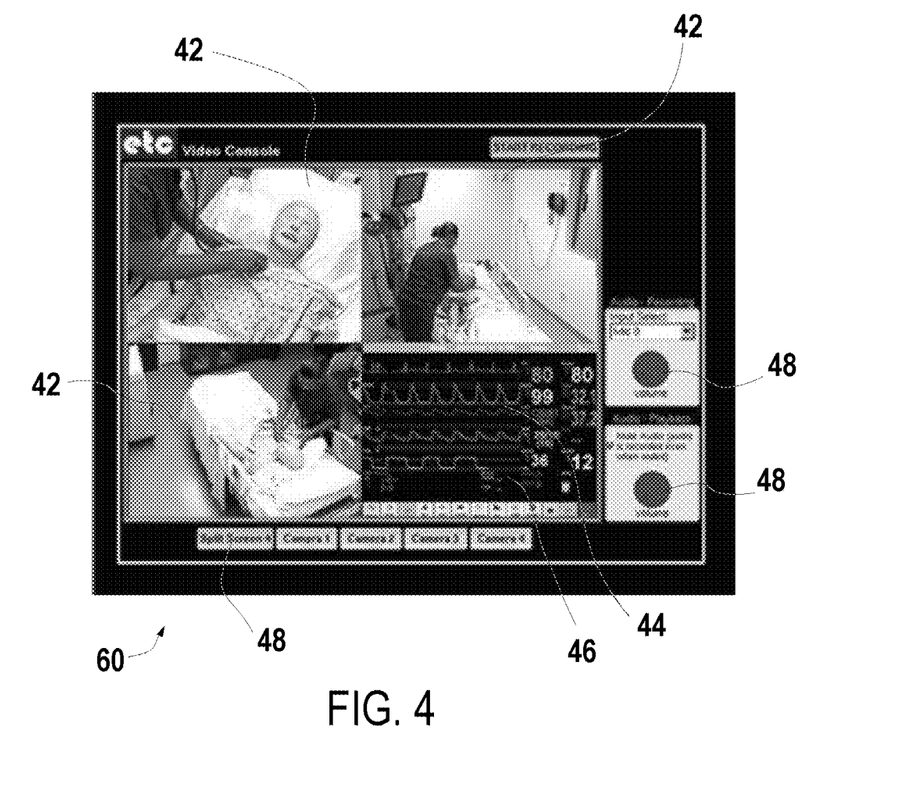
FIG. 4 is a schematic screenshot illustrating one set of video and data displays with on screen controls for the tablet based event recording system according to FIG. 3.

FIG. 4 is a representative screenshot illustrating several sets of video inputs 42, such as in the ambulance, emergency or triage ward, or several views of one location as shown, and several sets of data inputs 44 and 46 that have been combined with a common controller into one view as shown and with on screen controls 48 for the apparatus. The flagging controls are not shown but are the same as discussed above. The system allows for complete user control in the desired playback and can select to illustrate the flagging file if desired as discussed above.

The present invention provides an interactive, integrated log file of an event using the system. The integrated log file provides effective backup log file for the event. The integrated log file allows for significant screen control in the selective playback of the session. The integrated log file allows for downloading of the session in standard formatting for playback on other devices. The system allows for automatic user identification and incorporation of participant identification into the integrated log file.

The present invention as described provides that the flagging is via a handheld device, namely tablet or smartphone 12 with a plurality of input buttons or controls that each provide for independent flags to be entered into the log file as text and/or audio or video via the onboard camera.

There are many particular applications for the system, however it is particularly well suited for the following representative applications:

1. Mobile Inspections of a Given Remote Location Incorporating Sensors

The smartphone 12 based system of the present invention allows the user of the system to follow the motto SEE IT, SENSE IT, FLAG IT™ for comprehensive inspection events, such as a property inspection often related to a sale. The inspector will select the sensors 14 desired, such as a radon detector, a moisture detector, an air quality (particulate counter), and a GPS positioning sensor and couple these to the smartphone 12, generally wirelessly. The GPS positioning sensor, like the phone based camera and phone based microphone may already be onboard the smartphone 12. The inspector can start recording an inspection session that will integrate the audio, video and data files in one integrated session and the user can carry the smartphone 12 and sensors 14 (which may have their own carrier) around a property or building and add contemporaneous flagged comments during the review. For example the inspector may wish to comment on areas of high radon, or high particulate readings by noting relevant factors or issues either via text or simply noting a flag and starting and stopping an audio input flag via controls on the controller 20. The GPS sensor will note the inspector's position to associate the flagged events and the readings to the locations in the inspection. The system seamlessly integrates these inputs for later review in any desired fashion. The inspector can add later, non-contemporaneous flags in a follow up review. The final integrated session represents a simplified, reviewable inspection documentation that serves as the main substance of an inspectors report. This will simply the time of inspections and enhance the results thereof for inspectors and their clients.

2. Mobile or Stationary Temporary Surveillance of a Given Remote Location

The smartphone 12 based system of the present invention allows the user of the system to generate a comprehensive integrated record of a temporary surveillance event. Consider for example the provision of security for one (vehicle or pedestrian) access point to a closed event, e.g., a remote movie shoot. The security personal may select proximity sensors 14, possibly external cameras and a GPS positioning sensor and couple these to the smartphone 12, generally wirelessly. The GPS positioning sensor, like the phone based camera and phone based microphone may already be onboard the smartphone 12. The security personal can start recording only segments of the total event such as when the proximity sensor 14 indicates the presence of an incoming or outgoing vehicle or pedestrian. The session will integrate the audio, video and data files (i.e. GPS, proximity sensor) in one integrated session. The security personal can, and likely be expected to, add contemporaneous flagged comments during the event, that can be in addition to the audio/video record of the ingress and egress. The system seamlessly integrates these inputs for a comprehensive record which can be abbreviated to include only the sensed aspects of the event. The security personal or others can add later, non-contemporaneous flags in a follow up review. The final integrated session represents a simplified, reviewable documentation of the surveillance of the site that did not previously have a surveillance system in place.

3. Police and other First Responders Record of Interaction with an Individual Suspect or Patient The smartphone 12 based system of the present invention allows the first responders to use the system to create a comprehensive record of such events from original care at the remote location to the hospital. The first responders can effectively pass the smartphone off with the patient (for later reuse) to create one seamless record that can help later diagnosis and treatment. This use was described above and need not be repeated here.

The system can work analogously for Police, following a suspect from arrest through various stages of the investigation and suspect processing. The system can easily incorporate the audio and video feeds from dashboard cameras that are already in place to protect the Police and suspects and add integrity to the process. The smartphone 12 can incorporate data responses such as blood alcohol results from a breathalyzer sensor, speed determinations from a radar gun, objective video recording of field nystagmus/smooth pursuit testing, macro-pupilometry measurements. Further the system can be passed with suspects to station based cameras and more sophisticated sensors to maintain an integrated record with contemporaneous notations and solid chain of evidence. The officer can start recording a relevant session that will integrate the audio, video and data files in one integrated session and add contemporaneous flagged comments during the investigation. The system seamlessly integrates these inputs for later review in any desired fashion. The officer can add later, non-contemporaneous flags in a follow up review. The final integrated session represents a simplified, reviewable contemporaneous event documentation that greatly simplifies and expands the dashboard cameras used currently.

The wide variety of modifications and applications of the present invention will be apparent to those of ordinary skill in the art and these are included within the breadth and scope of the present invention. The scope of the present invention is defined by the appended claims and equivalents thereto.

What is claimed is:

1. An event recording system for multiple sensor integration with real time user controlled commenting and flagging comprising:
a portable computing device including multiple source integrating recording software configured to i) capture at least one video image of at least part of an event, ii) capture at least one audio record of the at least part of the event; iii) capture a plurality of data inputs of the at least part of the event; iv) integrate the at least one video image, the at least one audio record, and the plurality of data inputs into a common log file; v) contemporaneously flag the common log file by at least one user during the event; and vi) integrate the at least one video image, the at least one audio record, the plurality of data inputs, and the flag into a common time sequenced log file in a single integrated session;
at least one video camera coupled to the portable computing device during the at least part of the event configured to supply the at least one video image during the at least part of the event;
at least one microphone coupled to the portable computing device during the at least part of the event configured to supply the at least one audio record during tat least part of the event; and
a plurality of sensors coupled to the portable computing device via at least one controller during the at least part of the event configured to supply the plurality of data inputs during the at least part of the event, wherein the portable computing device is configured to independently select at least one sensor from the plurality of sensors to provide the plurality of data inputs for the at least part of the event,
at least one digital recorder configured to simultaneously receive the at least one video image, the at least one audio record, and the plurality of data inputs into a shared memory ring buffer to maintain a set time for the time sequenced log file,
wherein the contemporaneous flag operation further comprises adding time stamped flags to the common log file in real time by temporarily stopping the capture of the at least one video image as the at least part of the event is occurring, wherein the time stamped flags comprise at least one of user commentary, text, audio, video, and data files,
wherein the at least one controller is configured to format an individual output for each sensor of the plurality of sensors for recording and display in the at least one controller's own designated fashion, the individual output being configured as a separate video input to be received by the at least one digital recorder, the digital recorder being configured to integrate each individual output into the single integrated session that represents a single reviewable documentation of the event and the plurality of data inputs.

2. The event recording system for multiple sensor integration with real time user controlled commenting and flagging according to claim 1 wherein the portable computing device is a smartphone and wherein the smartphone is configured to receive an input for contemporaneously flagging the common log file.

3. The event recording system for multiple sensor integration with real time user controlled commenting and flagging according to claim 2 wherein that least one video cameras is integral with the smartphone.

4. The event recording system for multiple sensor integration with real time user controlled commenting and flagging according to claim 3 wherein the at least one microphone is integral with the smartphone.

5. The event recording system for multiple sensor integration with real time user controlled commenting and flagging according to claim 4 wherein the at least one video camera is a plurality of video cameras, and at least one video camera of the plurality of video cameras is wirelessly coupled to the common log file.

6. The event recording system for multiple sensor integration with real time user controlled commenting and flagging according to claim 5 wherein the common log file allows independent, simultaneous, synchronized, user controlled playback of the plurality of data inputs received within the common log file.

7. The event recording system for multiple sensor integration with real time user controlled commenting and flagging according to claim 6 wherein the smartphone is configured to allow for editing the common log file after integration into the signal integrated session to add, delete or modify a portion that had been flagged.

8. A method of event recording including multiple sensor integration with real time user controlled commenting and flagging comprising the steps of:
capturing at least one video image during at least part of an event in a common log file of a portable computing device which includes multiple source integrating recording software;
capturing at least one audio record of the at least part of the event in the common log file of the portable computing device;
capturing a plurality of data inputs in the common log file of the portable computing device during the at least part of the event, wherein a plurality of sensors coupled to the portable computing device via at least one controller during the at least part of the event are configured to supply the plurality of data inputs during the at least part of the event;
independently selecting at least one sensor from the plurality of sensors to provide the plurality of data inputs for the at least part of the event;
contemporaneously flagging the common log file by at least one user during the event;
integrating the at least one video image, the at least one audio record, the plurality of data inputs, and the flag into a common time sequenced log in a single integrated session;
simultaneously receiving the at least one video image, the at least one audio record, and the plurality of data inputs into a shared memory ring buffer to maintain a set time for the time sequenced log file; and
formatting, via the at least one controller, an individual output for each sensor of the plurality of sensors for recording and display in the at least one controller's own designated fashion, the individual output being configured as a separate video input to be received by a digital recorder, the digital recorder being configured to integrate each individual output into the single integrated session that represents a single reviewable documentation of the event and the plurality of data inputs,
wherein the contemporaneous flagging operation further comprises adding time stamped flags to the common log file in real time by temporarily stopping the capturing of the at least one video image as the at least part of the event is occurring, wherein the time stamped flags comprise at least one of user commentary, text, audio, video, and data files.

9. The method of event recording including multiple sensor integration with real time user controlled commenting and flagging according to claim 8 wherein the portable computing device is a smartphone and wherein the smartphone is configured to receive an input for contemporaneously flagging the common log file.

10. The method of event recording including multiple sensor integration with real time user controlled commenting and flagging according to claim 9 wherein the at least one video cameras is integral with the smartphone.

11. The method of event recording including multiple sensor integration with real time user controlled commenting and flagging according to claim 10 wherein the at least one microphone is integral with the smartphone.

12. The method of event recording including multiple sensor integration with real time user controlled commenting and flagging according to claim 11 wherein the at least one camera is a plurality of video cameras, and at least one video camera of the plurality of video cameras is wirelessly coupled to the common log file.

13. The method of event recording including multiple sensor integration with real time user controlled commenting and flagging according to claim 12 wherein the common log file allows independent, simultaneous, synchronized, user controlled playback of the plurality of data inputs received within the common log file.

14. The method of event recording including multiple sensor integration with real time user controlled commenting and flagging according to claim 11 wherein the event is a mobile inspection of a given remote location.

15. The method of event recording including multiple sensor integration with real time user controlled commenting and flagging according to claim 14 wherein the plurality of sensors include at least one of a radon detector sensor, a moisture detector sensor, an air quality sensor, and a GPS positioning sensor.

16. The method of event recording including multiple sensor integration with real time user controlled commenting and flagging according to claim 8 wherein the event is surveillance of a given remote location.

17. The method of event recording including multiple sensor integration with real time user controlled commenting and flagging according to claim 8 wherein the event includes police or other first responders record of an interaction with an individual suspect or patient.

18. The method of event recording including multiple sensor integration with real time user controlled commenting and flagging according to claim 8 wherein the event is a mobile inspection of a given remote location.

19. The method of event recording including multiple sensor integration with real time user controlled commenting and flagging according to claim 18 wherein the plurality of sensors include at least one of a radon detector sensor, a moisture detector sensor, an air quality sensor, and a GPS positioning sensor.

20. A method of conducting a session with a training simulator comprising at least one subject and at least one moderator comprising the steps of:
capturing at least one video image of the at least one subject during at least part of an event with the training simulator from at least one video camera;
capturing at least one audio record of the at least part of the event with the training simulator from at least one microphone;
capturing a plurality of data input throughout the at least part of the event which correspond to at least one simulated physiologic parameter of the training simulator;
independently selecting at least one data input from the plurality of data inputs;
integrating the plurality of data inputs of the training simulator, the at least one video image, and the at least one audio record into a common log file;
simultaneously receiving the at least one video image, the at least one audio record, and the plurality of data inputs into a shared memory ring buffer to maintain a set time of for the common log file;
contemporaneously flagging the common log file by at least one moderator generating a flag during the event through a wireless flagging controller, wherein the flag is time sequenced moderator input into the common log file, wherein the wireless flagging controller is a handheld device for entering the flag into the common log file; and
formatting, via the wireless flagging controller, an individual output of each data input of the plurality of data inputs for recording and display in the wireless flagging controller's own designated fashion, the individual output being configured as a separate video input to be received by a digital recorder, the digital recorder being configured to integrate each individual output into a single integrated session that represents a single reviewable documentation of the event and the plurality of data inputs,
wherein generating a flag involves adding a time stamped flag to the common log file in real time by temporarily stopping the capture of the at least one video image as the at least part of the event is occurring, wherein the time stamped flag comprises at least one of user commentary, text, audio, video, and data files, and
wherein the integrating the plurality of data inputs further comprises integrating the flag into the common log file so as to generate a single integrated session.

21. The event recording system for multiple sensor integration with real time user controlled commenting and flagging according to claim 1, wherein the portable computing device is further configured to auto-synch a feed from any one of the at least one video image, the at least one audio record, and the plurality of data inputs to the common log file when the feed comes into range so as to be picked up by the portable computing device.

22. The method of event recording including multiple sensor integration with real time user controlled commenting and flagging according to claim 8, further comprising auto-synching a feed from any one of the at least one video image, the at least one audio record, and the plurality of data inputs to the common log file when the feed comes into range so as to be picked up by the portable computing device.

23. The method of conducting a session with a training simulator comprising at least one subject and at least one moderator according to claim 20, further comprising auto-synching a feed from any one of the at least one video image, the at least one audio record, and the plurality of data inputs to the common log file when the feed comes into range so as to be picked up by the wireless flagging controller.

* * * * *